US006574955B2

(12) United States Patent
Schröder et al.

(10) Patent No.: US 6,574,955 B2
(45) Date of Patent: Jun. 10, 2003

(54) METHOD AND APPARATUS FOR DESULFURIZING A NITROGEN OXIDE ADSORBER

(75) Inventors: Doris Schröder, Sindelfingen (DE); Dirk Voigtländer, Korntal-Münchingen (DE); Michel Weibel, Stuttgart (DE); Günter Wenninger, Stuttgart (DE); Walter Boegner, Remseck (DE); Kirsten Hardenberg, Stuttgart (DE); Andreas Hertzberg, Stuttgart (DE); Günter Karl, Esslingen (DE); Bernd Krutzsch, Denkendorf (DE); Renate Marx, Leonberg (DE); Norbert Ruzicka, Steinenbronn (DE); Christof Schön, Remshalden (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/024,626

(22) Filed: Dec. 21, 2001

(65) Prior Publication Data
US 2002/0112471 A1 Aug. 22, 2002

Related U.S. Application Data

(63) Continuation of application No. PCT/EP00/04086, filed on May 6, 2000.

(51) Int. Cl.[7] .................................................. F01N 3/00
(52) U.S. Cl. .............................. 60/295; 60/276; 60/285; 60/297
(58) Field of Search .......................... 60/274, 285, 295, 60/297, 276, 286

(56) References Cited

U.S. PATENT DOCUMENTS

| | | | | | |
|---|---|---|---|---|---|
| 5,778,666 | A | * | 7/1998 | Cullen et al. | 60/274 |
| 5,832,722 | A | * | 11/1998 | Cullen et al. | 60/274 |
| 5,974,788 | A | * | 11/1999 | Hepburn et al. | 60/274 |
| 6,058,700 | A | * | 5/2000 | Yamashita et al. | 60/285 |
| 6,119,450 | A | * | 9/2000 | Boegner et al. | 60/274 |
| 6,161,377 | A | * | 12/2000 | Boegner et al. | 60/274 |

FOREIGN PATENT DOCUMENTS

| | | |
|---|---|---|
| DE | 195 22 165 | 12/1995 |
| DE | 198 02 631 | 7/1999 |
| EP | 0 636 770 | 1/1994 |

* cited by examiner

Primary Examiner—Thomas Denion
Assistant Examiner—Binh Tran
(74) Attorney, Agent, or Firm—Crowell & Moring LLP

(57) ABSTRACT

A method for the desulfurization of a nitrogen oxide adsorber of an exhaust gas purification device for a combustion system employs desulfurization phases that are intermittently implemented by a desulfurization control unit. During each desulfurization phase, the carbon monoxide concentration and/or the lambda value of the exhaust gas stream exiting the nitrogen oxide adsorber is recorded. A localized maximum that appears in the recorded course of the carbon monoxide concentration over time, or a downward slope that appears in the established course of the lambda value over time, falling from a temporary plateau value, is employed as criterion for terminating the desulfurization phase. The method may be used, for example, in exhaust gas purification devices in primarily lean-burning vehicle combustion engines.

11 Claims, 2 Drawing Sheets

METHOD AND APPARATUS FOR DESULFURIZING A NITROGEN OXIDE ADSORBER

This application is a continuation of International Patent Application No. PCT/EP00/04086 filed on May 6, 2000 designating the United States of America, the entire disclosure of which is incorporated herein by reference. Priority is claimed based on Federal Republic of Germany patent application No. DE 199 28 725.2, filed Jun. 23, 1999.

BACKGROUND AND SUMMARY OF INVENTION

The present invention relates to a method and an apparatus for desulfurizing a nitrogen oxide adsorber of an exhaust purification installation for a combustion system by way of desulfurizing phases that are implemented intermittently.

The process of employing nitrogen oxide adsorbers in waste gas purification devices for predominantly lean burning combustion systems, such as so-called low-performance vehicle engines, is known in the art. Most frequently, these adsorbers are in the form of so-called nitrogen oxide adsorber catalysts.

In the lean operation phases of a combustion system, during which the concentration of nitrogen oxide in the exhaust is increased most of the time, the nitrogen oxides are adsorbed and temporarily stored in the nitrogen oxide adsorber, predominantly in a nitrate form. When the nitrogen oxide adsorber reaches its highest utilization factor, it is switched from adsorption operation to desorption operation. The stored nitrogen oxides are once again desorbed and can be converted, e.g. in a reduction reaction, to nitrogen. In support of this process, among other things, the operation of the combustion system is converted from lean to rich. As is customary, lean or rich operation is defined as operation at an air/fuel ratio $\lambda$, also referred to as the air ratio, that is above or below the stoichiometric value of the air/fuel mixture that is being burned in the combustion system.

A known difficulty with such systems is that, due to the presence of sulfur which is contained in most fuels and motor oils, sulfur dioxide is present in the exhaust gas. Sulfur accumulation can lead to sulfur poisoning of the nitrogen oxide adsorber, reducing the capacity of the adsorber over time to store nitrogen oxide. Thus, it is known in the art that the nitrogen oxide adsorber is to be subjected to a desulfurization procedure whenever the capacity of the adsorber to store nitrogen oxide noticeably begins to decline in order to free the adsorber from the deposited sulfate. In the present context, the term nitrogen oxide adsorber shall refer to adsorbers that are comprised of a single adsorber body and, to adsorbers in which the nitrogen oxide adsorber body is preceded by a so-called $SO_x$ trap. The SOx trap temporarily stores the sulfur oxides thereby keeping them away from the nitrogen oxide adsorber body, and similarly undergoes intermittent desulfurization.

For the desulfurization of the nitrogen oxide adsorber, the method of converting the exhaust gas composition from lean to rich is known in the art, for example, by (1) a corresponding operation conversion of the combustion system and by thereby increasing the temperature in the exhaust gas pipe, :(2) an operation of the combustion system that will result in higher exhaust gas temperatures; and/or (3) an electrical heating device. This type of desulfurization method is described in EP 0 636 770 A1 (U.S. Pat. No. 5,483,795). Other, similar desulfurization methods that contain, in addition, a secondary air intake or split operation of a multi-cylinder combustion engine, which represents the source of combustion, into one part rich combustion cylinders and the other part lean combustion cylinders, are described in DE 195 22 165 A1; DE 197 47 222.2 (U.S. Pat. No. 6,161,377); and DE 198 02 631.5 (U.S. Pat. No. 6,119,450).

During the desulfurization of the nitrogen oxide adsorber, sulfur compounds, with sulfur dioxide and hydrogen sulfide occurring predominantly, get into the exhaust gas that is exiting the nitrogen oxide adsorber. Hydrogen sulfide, as is generally known, has a pungent odor and represents odor pollution even at relatively low concentrations.

The present invention relates to the technical problem of providing a method and an apparatus that will allow for the effective desulfurization of the nitrogen oxide adsorber, while ensuring that steps are taken for minimizing the hydrogen sulfide emissions.

With the method according to the present invention and the apparatus of the present invention, the concentration of carbon monoxide (CO) and/or the lambda value of the exhaust gas stream exiting the nitrogen oxide adsorber are recorded during a respective desulfurization phase.

Studies have shown that, after the start of a desulfurization phase involving the conversion from a lean to a rich exhaust gas composition, a release of sulfur dioxide ($SO_2$) occurs initially. Then, over the course of this release of sulfur dioxide, the carbon monoxide concentration in the exhaust gas begins to rise to a localized maximum from which point it falls again. On the other hand, the lambda value of the exhaust gas drops at first only as far as a temporary plateau value in the range of the stoichiometric value one where it remains for some time, before dropping at a visibly steep slope to a corresponding target value. Only after the appearance of this localized maximum in the CO concentration curve or of the drop of the slope of the lambda value from the plateau value to the target value, begins the noticeable formation of hydrogen sulfide ($H_2S$). This knowledge is used in the present instance to detect during the desulfurization phase, by recording the CO content, the appearance of the localized maximum or, by recording the lambda value, the appearance of the downward gradual slope and to use this data as a criterion for the termination of the desorption phase.

This allows prevention of the premature termination of the desulfurization phase or, in terms of hydrogen sulfide emissions, the belated termination of the respective desulfurization phase. If the phase is terminated prematurely, regeneration would remain incomplete, even if, as studies have shown, multiple, consecutive repetitions of such abbreviated desulfurization phases are implemented. If the desulfurization phase last too long, perceptible quantities of hydrogen sulfide would form that would undesirably be emitted along with the exhaust gas or would have to be rendered harmless at additional effort and expense.

In contrast, by terminating the desulfurization phase at the time the localized maximum of the CO concentration curve is reached or at the time the downward slope of the lambda value curve occurs, or at a defined time slightly after that time, it is possible to achieve an essentially complete desulfurization and therefore regeneration of the nitrogen oxide adsorber. In addition, the formation of perceptible quantities of hydrogen sulfide can be prevented without additional measures. Depending on the specific application, only one desulfurization phase or several consecutive desulfurization phases of this type can be envisioned to ensure complete desulfurization of the nitrogen oxide adsorber. These phases are interrupted, respectively, by a brief conversions to a lean exhaust gas composition.

Other objects, advantages and novel features of the present invention will become apparent from the following detailed description of the present invention when considered in conjunction with the accompanying drawings.

DETAILED DESCRIPTION OF THE DRAWINGS

Figure 1:
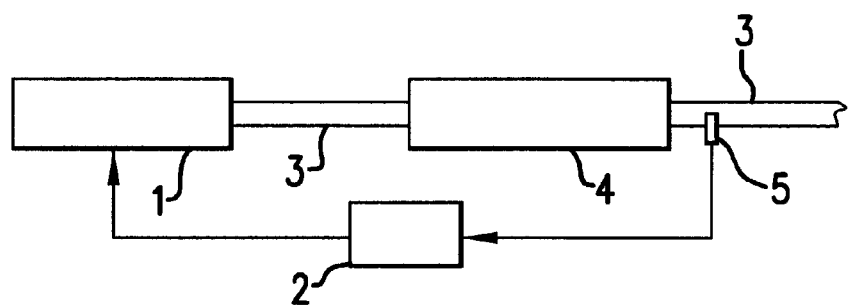
FIG. 1 shows a schematic block diagram of a combustion system, including an exhaust gas purification device with a nitrogen oxide adsorber catalytic converter and a desulfurization device.

FIG. 1 shows a schematic depiction of a combustion system 1 which can, for example, be a primarily lean-burning Otto-engine or diesel engine of a motor vehicle and that has an exhaust gas purification device. The exhaust gas purification device contains a catalytically acting nitrogen oxide adsorber, (i.e. a nitrogen oxide adsorber catalyst 4) that is positioned in the exhaust gas line 3 of the combustion system 1.

In keeping with the general desire for minimum fuel consumption, the combustion system 1 is driven in lean-burning operation as much as possible, specifically for as long as the operating conditions permit. However, lean-burning operation results, as a rule, in an increased share of nitrogen oxide in the exhaust gas produced by the combustion system 1. During these operational phases of adsorption operation, the adsorber catalytic converter 4 is intended to remove the nitrogen oxides from the exhaust gas stream by adsorption. As soon as its capacity to adsorb nitrogen oxide is exhausted, it is switched over to desorption operation. The adsorber catalytic converter 4 is regenerated during the desorption phase. In particular, the nitrogen oxides, which were stored until then primarily in the form of nitrates or nitrites, are again desorbed and converted.

Several conventional methods, which are of no further interest in the present context, are possible for this conversion, including exhaust gas recycling or catalytic reduction by adding a suitable reducing agent, such as unburned fuel or ammonia, through the combustion system 1 or via an external feed directly into the exhaust gas line 3. Following the complete desorption of the nitrogen oxides, the system can be switched back to adsorption operation. By adjusting suitable conditions, desorption can be performed relatively rapidly, thereby allowing the desorption phases to be kept comparatively short relative to the adsorption phases. In addition to this nitrogen oxide purification function, further exhaust gas purification functions can be envisioned for the exhaust gas purification device using conventional means, which is of no further interest in the present context and therefore not further illustrated.

If sulfur-containing fuels, e.g. conventional sulfur-containing fuels for vehicle combustion engines, are used in the combustion system 1, sulfur that is contained in the exhaust gas along with the nitrogen oxides also becomes deposited in the adsorbing catalyst 4, primarily in the form of sulfate. The sulfur deposit is rather resistant in contrast to the usual nitrogen oxide desorption conditions, causing the sulfur that is deposited during the adsorption operation not to be completely released during the nitrogen oxide desorption operation. Because the deposited sulfur blocks the nitrogen oxide adsorption centers of the adsorber catalytic converter 4, the adsorber catalytic converter experiences sulfur poisoning over time that will decrease its capacity to store nitrogen oxide. If the nitrogen oxide storage capacity drops below a certain value, a desulfurization process is therefore initiated, during which the adsorber catalytic converter 4 is subjected to suitable desulfurization conditions for a period of time that is typically much longer than that for a nitrogen oxide desorption phase.

At the start of the desulfurization phase, this involves a rapid conversion from a previously lean exhaust gas composition to a rich exhaust gas composition (e.g. the combustion system 1 is fed a rich instead of a lean air/fuel mixture, or hydrocarbons are added to the exhaust gas stream from the outside). Also, a suitable desulfurization temperature of, for example, 600° C. or more is maintained. This causes the sulfates that are attached to the catalytic converter material of the adsorber catalytic converter 4 to become unstable, allowing them to be desorbed.

Figure 2:
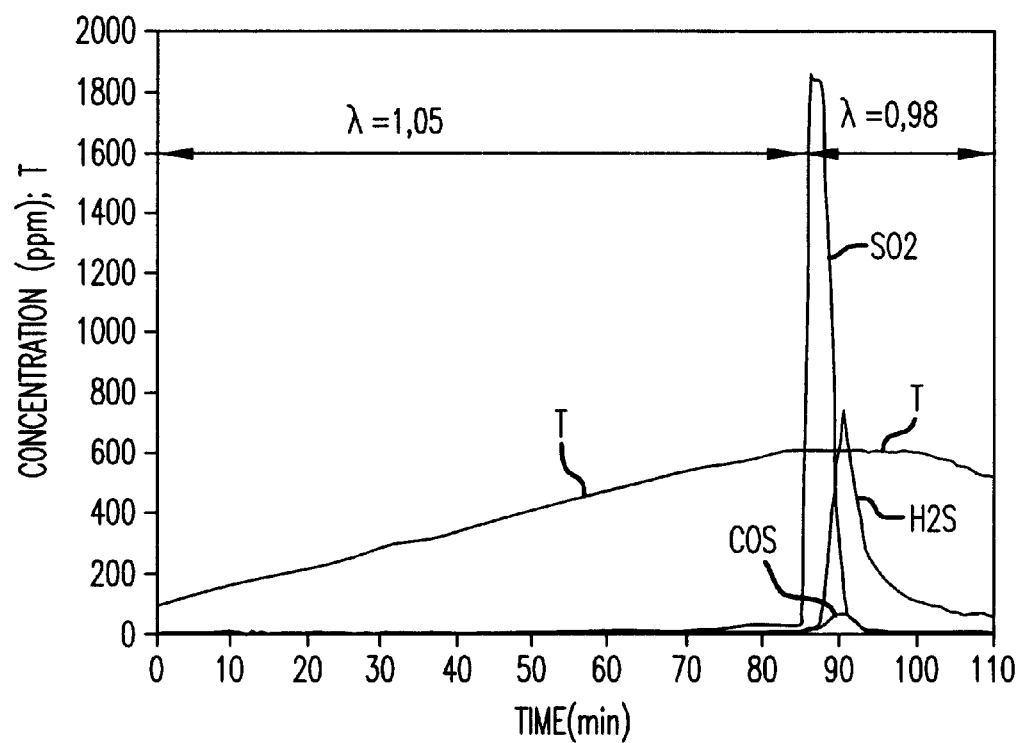
FIG. 2 shows a curve diagram illustrating the concentrations of various exhaust gas components downstream from the nitrogen oxide adsorber during a test run phase of the combustion system shown in FIG. 1, including a desulfurization process.
Figure 3:
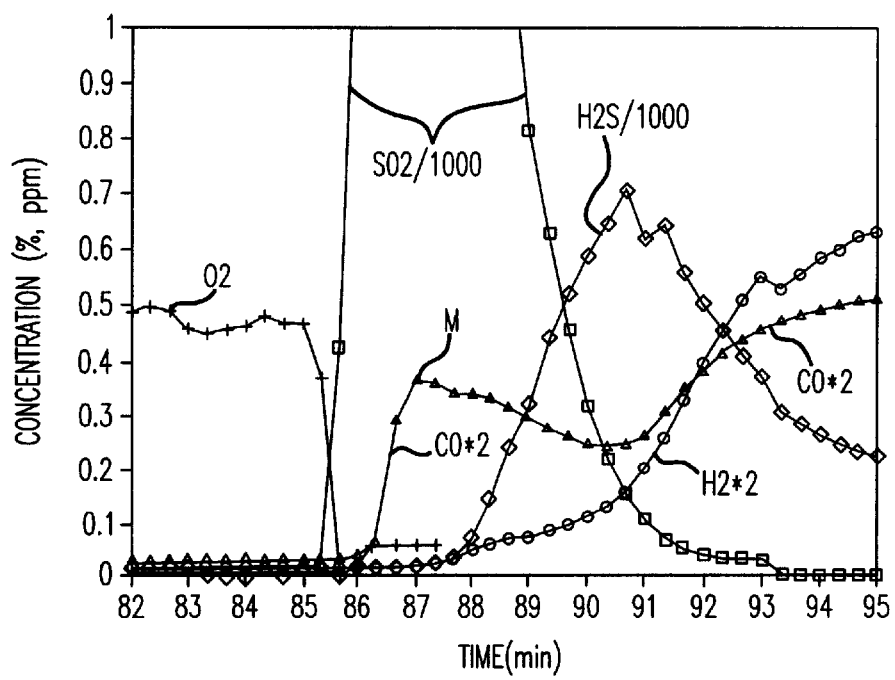
FIG. 3 shows a detailed curve diagram corresponding to FIG. 2 across the time period of the desulfurization process, with evaluation of the carbon monoxide concentration.

FIGS. 2 and 3 represent the results of an experimental test run of the system in FIG. 1 in the form of a diagram. This test run was performed to examine the course over time of the concentration of various exhaust gas components, downstream from the adsorber catalytic converter 4, especially also during a desulfurization phase.

In FIG. 2, over a period of 110 min, the exhaust gas temperature is charted with a temperature curve T. The sulfur dioxide concentration in the exhaust gas stream is charted with the sulfur dioxide characteristic curve SO2. The hydrogen sulfide concentration in the exhaust gas stream is charted with the characteristic curve H2S, and the COS (carbon oxysulfide) concentration of the exhaust gas stream is charted with the characteristic curve COS. Each of the above is indicated in its time interval as recorded via corresponding sensors in the exhaust gas line 3, downstream from the adsorber catalytic converter 4, during the test run phase.

The diagram in FIG. 3 shows with greater detail over a period of time a desulfurization phase of 82 min to 95 min after the start of the test run phase. The concentration of oxygen in the exhaust gas is charted with the characteristic curve O2. The SO2 concentration in the exhaust gas, reduced by a factor 1,000, is charted with the characteristic curve SO2/1000. The H2S concentration in the exhaust gas, also reduced by a factor 1000, is charted with the characteristic curve H2S/1000. The hydrogen concentration in the exhaust gas, increased by a factor 2, is charted with the characteristic curve H2*2, and the carbon monoxide concentration in the exhaust gas, also increased by a factor 2, is charted with the characteristic curve CO*2. Each of these measurements was taken downstream from the adsorber catalytic converter 4. As in FIG. 2, all the above-named dimensions are marked quantitatively over the course of time.

As illustrated in FIG. 2, for an initial time period of about 85 min, the combustion system 1 is run in lean-burning operation, in particular in such a way that the air ratio $\lambda$ of the exhaust gas emitted by the combustion system 1 is within the lean range, for example at $\lambda=1.05$. Subsequently, at the beginning of the desulfurization phase, the device jumps to rich-burning operation, represented in the example in FIG. 2 with the exhaust gas/air ratio in the rich range of $\lambda=0.98$. The switch from lean operation to rich operation is reflected in the drop of the oxygen concentration in the exhaust gas at the time of the switchover to desorption operation. This is illustrated with the characteristic oxygen curve O2 in FIG. 3.

It is also easily detectable from FIGS. 2 and 3 that immediately following the start of the desulfurization phase, at the time t=85 min, the SO2 concentration in the exhaust gas, downstream from the adsorber catalytic converter 4, rises steeply, reaches a maximum after approximately 2 min. and then drops again relatively symmetrically. This indicates that, due to the start of the desulfurization phase, sulfur has been released from the adsorber catalytic converter 4.

From the hydrogen sulfide curve H2S, it can also be clearly seen that the formation of hydrogen sulfide does not set in immediately following the start of the desulfurization phase, as with the formation of sulfur dioxide, but somewhat delayed in comparison. In the example shown here, the hydrogen sulfide concentration does not begin rise noticeably until approximately 3 min after the start of the desulfurization phase until it reaches a maximum. After reaching a maximum, it begins to drop somewhat more slowly. The course the carbon monoxide concentration takes during desulfurization is interesting in the present context. As the characteristic curve CO*2 shows, the CO concentration in the exhaust gas downstream from the adsorber catalytic converter 4 increases only slowly at first after the start of desulfurization for approximately 1 min, then steeply for a period of 0.5 minutes, until it reaches, at the approximate time t=87 min after the start of the test run, i.e. roughly at the time of maximum $SO_2$ release, a localized maximum M. Afterwards, it begins dropping slowly before rising again at a later time.

Studies have shown that this localized maximum in the CO*2 characteristic curve of the carbon monoxide concentration always occurs prior to the onset of noticeable hydrogen sulfide formation, at a time when significant sulfur quantities have been desorbed in the adsorber catalytic converter 4 and emitted as sulfur dioxide. This knowledge is employed in the present context in order to use the appearance of the localized maximum M of the CO concentration in the exhaust gas, downstream from the adsorber catalytic converter 4, during a desulfurization phase as a criterion for a timely termination of the desulfurization phase, before perceptible quantities of hydrogen sulfide form. The desulfurization phase can, for this purpose, be terminated immediately following the detection of the localized maximum M of the CO concentration, or it can be delayed by a defined, predetermined time interval. The offset period can, for example, be determined experimentally and be made dependent on the quantity of H2S emissions that are to be tolerated. In this process, care is taken to ensure the most extensive desulfurization of the adsorber catalytic converter 4 that is possible, as studies have shown that desulfurization phases that are too short, accompanied by only a partial sulfate regeneration, apparently do not result in a complete regeneration of the adsorber catalytic converter 4, even if multiple, consecutive applications are implemented.

Figure 4:
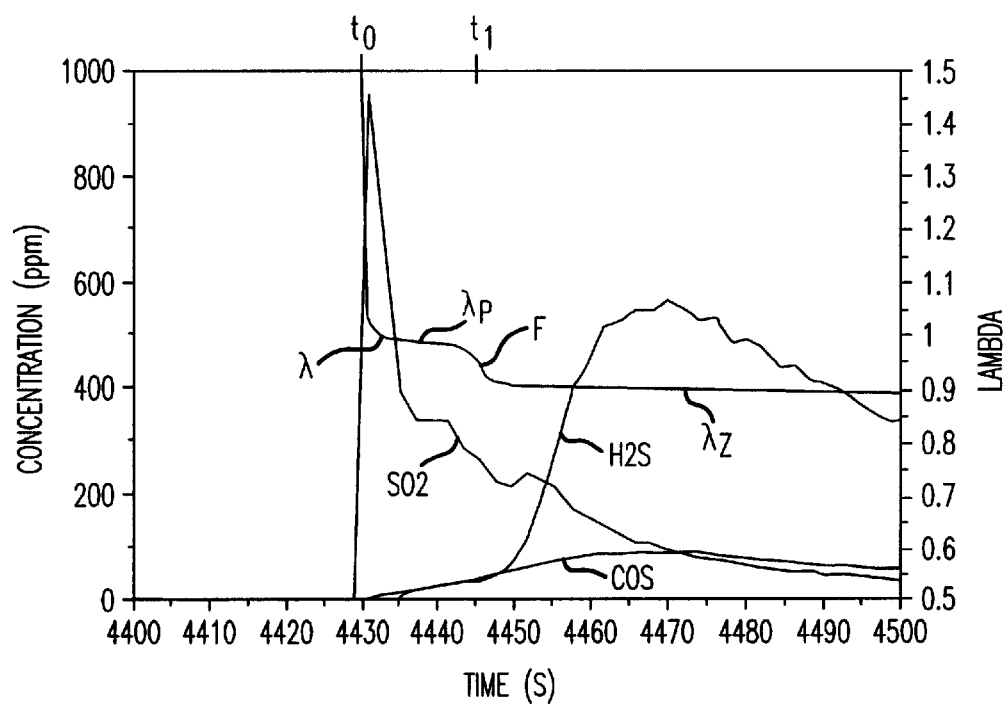
FIG. 4 shows a detailed curve diagram over the time period of a desulfurization process, with evaluation of the lambda value.

FIG. 4 shows, similarly to FIG. 3 but over a longer period of time, a characteristic curve diagram for another embodiment according to the present invention, in which is inserted in the place of the CO sensor 5 in the system shown in FIG. 1 a conventional lambda probe that records the lambda value of the exhaust gas stream exiting the nitrogen oxide adsorber 4 and reports that value to the desulfurization control unit 2. In the example shown in FIG. 4, following a 30-minute adsorption phase, at the time $t_0=4430s$, the device is switched over to a desulfurization process. Once again, this occurs due to the jump-like switch-over of the lambda ratio of the mixture being fed to the combustion system 1 to a rich value, for example to a value of approximately 0.9. As is apparent in FIG. 4, immediately following the switch to desulfurization, the sulfur dioxide characteristic curve SO2, and the characteristic curve COS that indicates carbon oxysulfide concentration in the exhaust gas stream, return to their original courses discussed above in connection with FIG. 2 (i.e., there is a drop in the $SO_2$ concentration and a temporary increase in the carbon oxysulfide concentration).

At the same time, as follows clearly from FIG. 4, a drop in the lambda value $\lambda$ of the exhaust gas composition, which is measured by the lambda probe downstream from the nitrogen oxide adsorber 4, is observed initially only up to a plateau value $\lambda P$, which is approximately at the stoichiometric value one. Until the time $t_1=4445s$, the lambda value $\lambda$ of the exhaust gas, downstream from the nitrogen oxide adsorber 4, hardly drops at all; instead, it remains at the plateau value $\lambda_P$. Only afterwards at time $t_1$, the exhaust gas lambda value $\lambda$ that was measured by the lambda probe drops again along a relatively steep slope F from the plateau area $\lambda_P$ to the target value $\lambda_2$, which corresponds to a conversion to a rich exhaust gas composition at the start of the desulfurization process, for example, to a target value of $\lambda_2=0.9$. The appearance of this graduated, downward slope F of the exhaust gas lambda value $\lambda$ coincides in terms of time precisely with the beginning of a noticeable increase of the release of $H_2S$, as demonstrated in FIG. 4 with the H2S characteristic curve indicating hydrogen sulfide concentration in the exhaust gas downstream from the adsorber catalytic converter 4.

This experimental result shows the appearance of the downward graduated slope F of the exhaust gas/air ratio $\lambda$ can be used in the same way as the localized maximum M in the CO concentration in FIG. 3 as criterion for the timely termination of a desulfurization phase before any noticeable release of $H_2S$ takes place. Therefore, any excessive release of hydrogen sulfide during the desulfurization can be avoided by terminating the desulfurization process when the exhaust gas lambda value $\lambda$ noticeably drops below the stoichiometric value one.

Obviously, if necessary, only the one or only the other or both criteria in a combined form can be employed for determining when to terminate the desulfurization phase. When using both criteria, a CO sensor and a lambda probe are positioned in the exhaust gas line 3, downstream from the adsorber catalytic converter 4, and the desulfurization control unit 2 suitably evaluates the output signals from both sensors. Depending on the specific application, this may result in a termination of the desulfurization phase upon the initial appearance of the first of the two criteria or dependent upon the appearance of the second criterion as well, respectively with or without a time delay. Furthermore, a redundancy applies in this case that will improve reliability and will continue to allow for the timely termination of desulfurization prior to any noticeable release of $H_2S$, even if either the CO sensor or the lambda probe is defective.

In any case, the present invention provides a simple possibility for determining a favorable time for shutting off the desulfurization phases. It allows for, if required, a changeover from desulfurization operation to subsequent normal operation involving a lean exhaust gas composition, even before significant quantities of hydrogen sulfide form. The present invention does not need a hydrogen sulfide sensor but only a conventional carbon monoxide sensor 5 and/or a conventional lambda probe in the exhaust gas line 3 downstream from the adsorber catalytic converter 4, as is shown in FIG. 1. As the illustration in FIG. 1 also shows, this is expanded into a corresponding desulfurization apparatus by envisioning a desulfurization control unit 2 to which the output signal from the CO sensor 5 or the lambda probe is sent and that controls the operation of the combustion system 3 depending on this signal. If a motor vehicle combustion engine is used as the combustion system 1, the desulfurization control unit 2 is preferably constituted of a motor control device that controls the vehicle combustion engine 1 in a conventional manner.

Regarding the desulfurization function, the desulfurization control unit 2 switches the combustion system 1 from lean-burning operation to rich-burning operation, if necessary, in order to initiate a desulfurization phase and monitors thereafter the course over time of the carbon monoxide concentration or of the lambda value in the exhaust gas downstream from the adsorber catalytic converter 4 by monitoring the output signal of the CO sensor 5 or of the lambda probe. As soon as the desulfurization control unit 2 recognizes that the recorded carbon monoxide concentration has reached its localized maximum M and/or the recorded lambda value has reached its downward slope F from the temporary plateau value $\lambda_P$, it terminates the desulfurization phase either immediately or with a predetermined time delay by way of switching the combustion system 1 back to lean-burning operation.

It is understood that the present invention can be used in exhaust gas purification systems of vehicle combustion engines but is not limited to them; instead, it is also suited for use in any other stationary or non-stationary combustion systems that emit sulfur-containing exhaust gas and that have an exhaust gas purification device equipped with a nitrogen oxide adsorber allocated to them.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A method for the desulfurization of a nitrogen oxide adsorber in an exhaust gas purification device of a combustion system, comprising:

during a desulfurization phase, recording at least one of a carbon monoxide concentration and a lambda value of exhaust gas stream exiting a nitrogen oxide adsorber; and terminating the desulfurization phase when at least one of (a) a localized maximum (M) appears over time for a CO concentration and (b) a downward slope (F) appears over time for the lambda value falling from a temporary plateau value ($\lambda_P$) in a range of a stoichiometric value of one to a target value ($\lambda_2$) for a rich exhaust gas composition.

2. A method according to claim 1, further comprising intermittent desulfurization phases.

3. A method according to claim 1, wherein the exhaust gas purification system is in a motor vehicle combustion engine.

4. A method according to claim 1, comprising terminating the desulfurization phase when a localized maximum (M) appears over time for a CO concentration.

5. A method according to claim 1, comprising terminating the desulfurization when a downward slope (F) appears over time for the lambda value, falling from a temporary plateau value ($\lambda_P$) in a range of a stoichiometric value of one to a target value ($\lambda_2$) for a rich exhaust gas composition.

6. A method according to claim 1, further comprising:

generating an output signal from at least one of the carbon monoxide sensor and the lambda probe;

directing the output signal to a desulfurization control unit;

evaluating the output signal over time for an appearance of at least one of a localized maximum (M) of the carbon monoxide concentration and a downward slope (F), falling from a temporary plateau value ($\lambda_P$) in the range of the stoichiometric value one to a target value ($\lambda_2$) for a rich exhaust gas composition;

wherein the desulfurization control unit determines an end of the desulfurization phase depending on the time of the appearance of at least one of the localized maximum (M) of the carbon monoxide concentration and the downward slope (F) of the lambda value.

7. An apparatus for the desulfurization of a nitrogen oxide adsorber, comprising:

a desulfurization control unit for adjusting suitable desulfurization conditions during one or more desulfurization phases; and at least one of a carbon monoxide sensor for detecting a carbon monoxide concentration and a lambda probe for detecting the lambda value of the exhaust gas stream exiting the nitrogen oxide adsorber, wherein the desulfurization control unit is adapted to receive an output signal from the carbon monoxide sensor or the lambda probe and to evaluate the output signal in terms of a course over time of at least one of an appearance of a localized maximum for a CO concentration and an appearance of a downward slope for a lambda value falling from a temporary plateau value in a range of a stoichiometric value of one to a target value for a rich exhaust gas composition, the desulfurization control unit capable of determining an end of the desulfurization phase depending on the time of the appearance of the localized maximum or the downward slope.

8. An apparatus according to claim 7, comprising a carbon monoxide sensor for detecting a carbon monoxide concentration.

9. An apparatus according to claim 7, comprising a lambda probe for detecting the lambda value of the exhaust gas stream exiting the nitrogen oxide adsorber.

10. An exhaust gas purification system comprising an apparatus according to claim 7.

11. A motor vehicle combustion engine comprising an apparatus according to claim 7.

* * * * *